United States Patent [19]

Block et al.

[11] Patent Number: 5,203,370
[45] Date of Patent: Apr. 20, 1993

[54] MOUNTING APPARATUS WITH FUGITIVE EMISSION COLLECTION MEANS FOR DIRECTLY COUPLING A ROTARY VALVE TO AN ACTUATOR HAVING ROTARY DRIVE MEANS

[76] Inventors: Gary C. Block, 325 Thomas St., Carnegie, Pa. 15106; Gary W. Friedline, R.D. #3, Box 42a, New Alexandria, Pa. 15670

[21] Appl. No.: 800,350

[22] Filed: Nov. 26, 1991

[51] Int. Cl.⁵ .......................... G01M 3/04; F16K 43/00
[52] U.S. Cl. .......................... 137/312; 73/46; 137/315; 251/214; 277/2; 277/17
[58] Field of Search .................... 137/312, 315; 73/40, 73/46; 251/214; 277/2, 15, 17, 19, 21

[56] References Cited

U.S. PATENT DOCUMENTS

| | | | |
|---|---|---|---|
| 2,691,773 | 10/1954 | Lichtenberger | 137/312 |
| 2,839,074 | 6/1958 | Kaiser | 137/315 |
| 2,954,797 | 10/1960 | Dryer | 137/312 |
| 2,963,260 | 12/1960 | Siravo | 251/54 |
| 2,963,262 | 12/1960 | Shafer | 251/172 |
| 3,218,024 | 11/1965 | Kroekel | 251/58 |
| 3,650,506 | 3/1972 | Bruton | 251/58 |
| 4,010,769 | 3/1977 | De Lorenzo et al. | 137/312 |
| 4,444,216 | 4/1984 | Loup | 251/249.5 |
| 4,647,003 | 3/1987 | Hilpert et al. | 251/14 |
| 4,660,591 | 4/1987 | Brown et al. | 251/214 |
| 4,719,939 | 1/1988 | Killian | 137/315 |
| 4,887,634 | 12/1989 | Killian | 137/315 |
| 4,901,751 | 2/1990 | Story et al. | 137/312 |
| 4,972,867 | 11/1990 | Ruesch | 137/312 |

OTHER PUBLICATIONS

Fugitive Emission Journal— Valve Technology Edition— Mar. 1991 by Worcester Controls Corp.

Primary Examiner—George L. Walton
Attorney, Agent, or Firm—Kirkpatrick & Lockhart

[57] ABSTRACT

An apparatus for mounting a rotary actuator, having a rotary drive bushing, to a valve stem of a rotary controlled valve having first and second primary seals and a fugitive fluid collection chamber therebetween. The apparatus includes a mounting member disposed between the actuator and the valve which is removably fastened thereto to permit the valve stem to coaxially engage the rotary drive bushing provided in the rotary actuator. O-rings are affixed to flanges that extend from the ends of the mounting member for creating a fluid-tight seal between the mounting member and the actuator and between the mounting member and the valve. The fluid-tight mounting member serves to provide a secondary fugitive fluid collection chamber outboard of the secondary stem seals that is adapted to collect the fugitive fluid that passes the secondary stem seals. A fluid detection device may be attached to the secondary fugitive fluid collection chamber via a port provided in the mounting member.

9 Claims, 4 Drawing Sheets

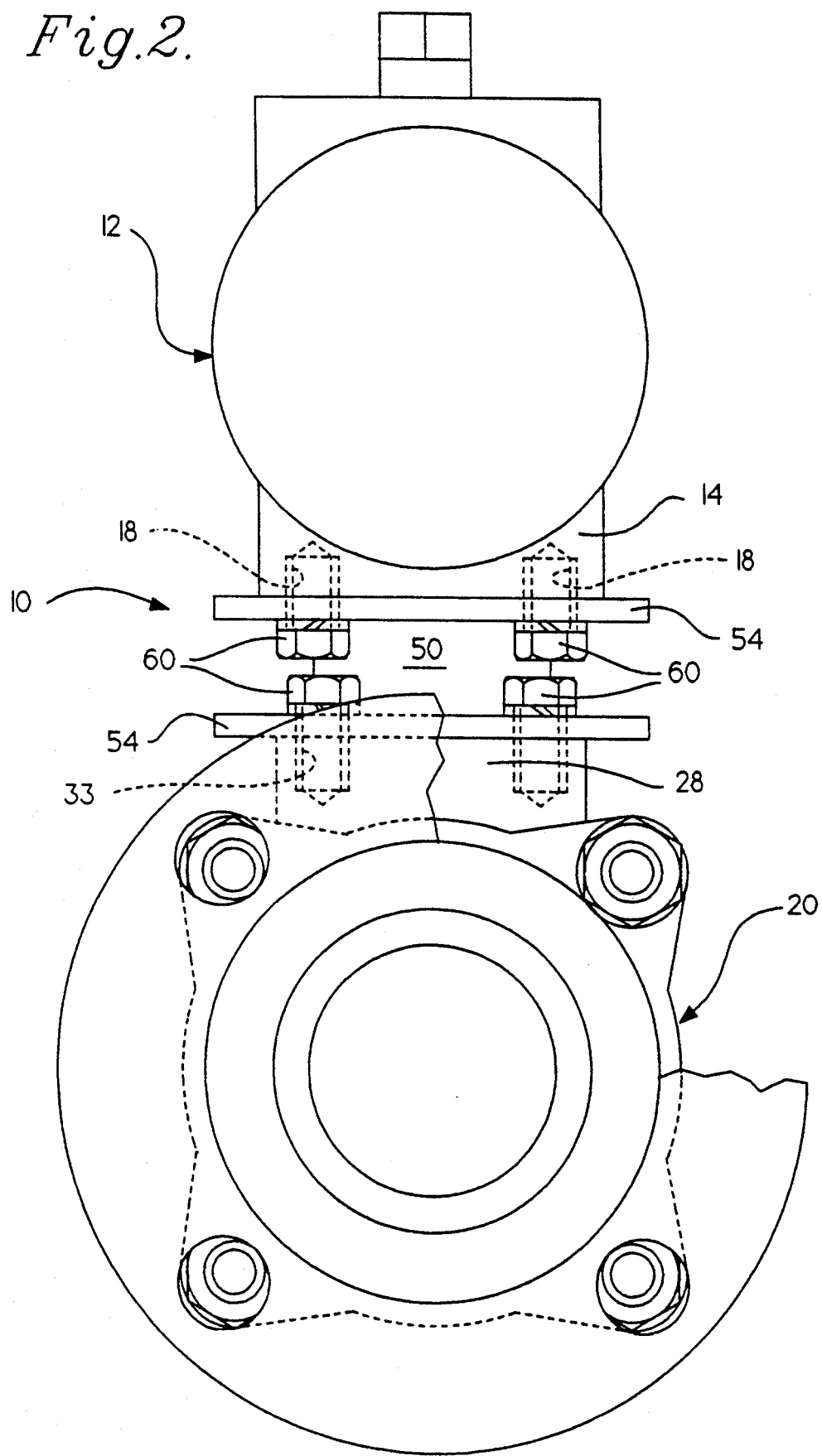

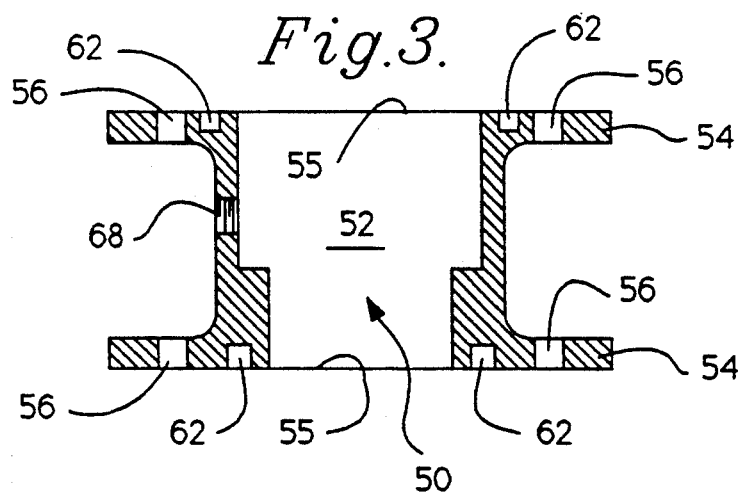
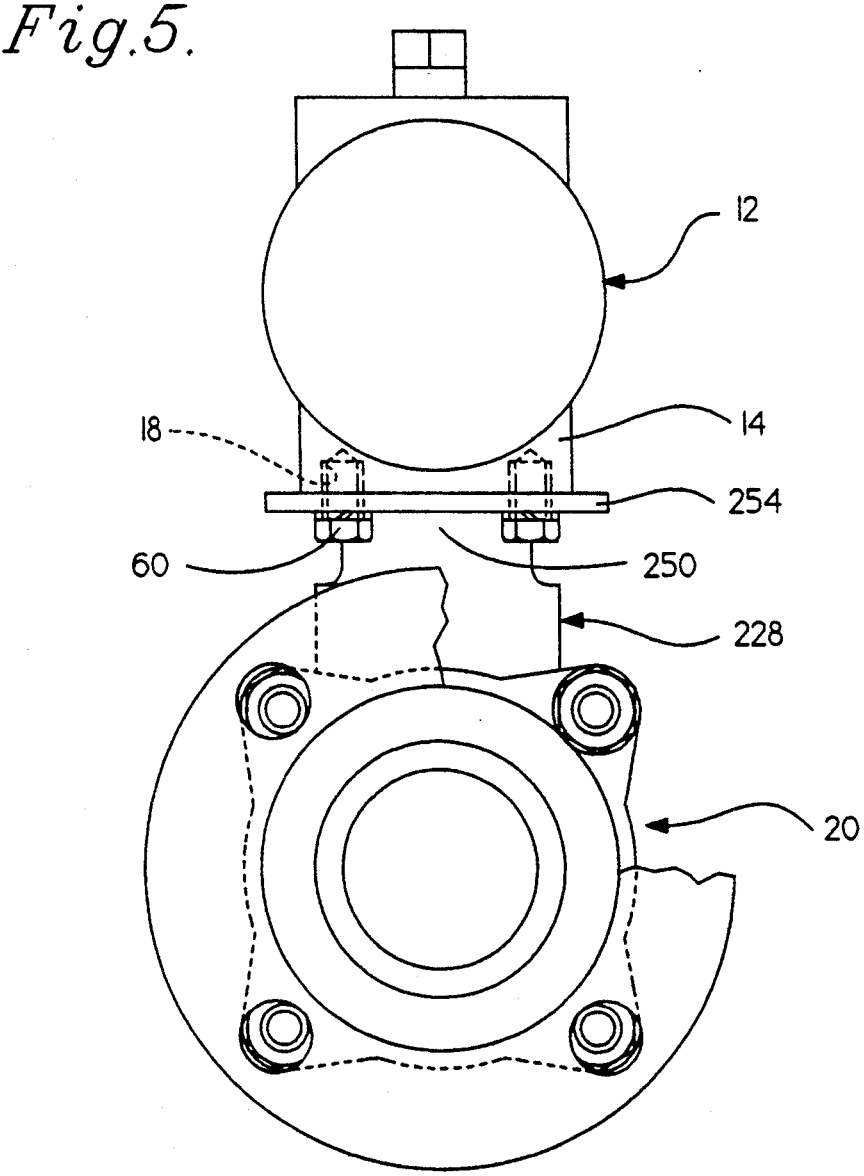

MOUNTING APPARATUS WITH FUGITIVE EMISSION COLLECTION MEANS FOR DIRECTLY COUPLING A ROTARY VALVE TO AN ACTUATOR HAVING ROTARY DRIVE MEANS

BACKGROUND OF THE INVENTION

1. Field of the Invention

The present invention relates to apparatus for collecting fluid leakage that by-passes the stem seals on a rotary valve and, in particular, to actuator mounting apparatus for directly coupling a ball valve stem to a rotary actuator wherein the fluid leakage that by-passes the valve stem seals is collected therein.

2. Description of the Invention Background

The Environmental Protection Agency ("EPA") has recently estimated that more than 2.7 billion pounds of toxic air pollutants are emitted into the atmosphere every year. The EPA further estimates that the effects of these pollutants on the public health range from 1,000 to 3,000 additional cancer deaths annually.

Those studies and others like them, have helped to heighten the public's awareness and concern over pollution and its effects on the population and environment. Indeed, one need only open any industrial trade journal or major newspaper to appreciate the ever-increasing environmental legislation and public pressure being imposed upon industry to control pollution. For example, the Clean Air Act Amendments of 1990 have increased the number of regulated air pollutants from 7 to 189. Those amendments further require that industrial plants identified as being sources of such pollutants must install the best available pollution control devices to reduce their emissions to acceptable levels.

An important aspect of pollution control is centered around the elimination of fugitive emissions. Fugitive emissions is a term of art that refers to the leakage of liquid or gaseous process fluid from equipment such as valves, pumps and connectors. Although fugitive emissions emanating from a single valve or pump tend to be relatively small and sporadic, the large number of valves, pumps and connectors in most plants makes them a significant contributor to pollution.

Typically, the greater the majority of valve fugitive emissions tend to emanate from the valve stem area. Therefore, in the face of this burgeoning legislation, various valves and actuator connector apparatuses have been developed for detecting and collecting fugitive emissions that by-pass the valve stem seals. For example, U.S. Pat. No. 4,972,867 discloses a valve stem seal leak protection and detection apparatus that is adapted to detect and collect fugitive emissions that have by-passed the primary or first valve stem seal. That device comprises a stem extension member that is surrounded by a fluid collection and detection chamber that is connected to the upper portion of the valve. Secondary seals are provided on the outboard end of the chamber to prevent leakage around the stem extension member. However, the fugitive fluid that manages to by-pass the secondary stem extension seals is permitted to enter the environment with no warning.

In addition, that device has the distinct disadvantage of amplifying the amount of leakage permitted to by-pass the primary stem seal as a result of seal wear and failure. More specifically, as the distance between the primary stem seal and the point where the valve stem engages the rotary actuator is increased, the resulting moment acting on the primary seal is also increased which tends to further stress the primary stem seal. Therefore, it is desirable to keep the distance between the rotary actuator and the stem seals to a minimum to reduce the stress imposed on the stem seals and thereby increase the life of the seals. That aspect of actuator-to-valve attachment becomes even more critical when using ball valves, which are notorious for leaking around the stem seals.

There exists a wide variety of apparatuses for attaching a rotary actuator to a rotary controlled valve. For example, shaft-to-stem coupling devices have been used to connect the valve stem to a rotary output shaft of an actuator. That coupling method, however, increases the distance between the stem seals and the actuator and thus increases the amount of stress applied to the stem seals. Such devices not only increase the effective distance between the stem seals and the actuator, but also impact additional stress on the stem if the valve stem and the rotary output shaft are non in perfect alignment. Often times, due to the particular location of the valve, it becomes impossible to accurately determine whether the valve stem is in perfect axial alignment with the rotary output shaft of the actuator. Also, those coupling devices do not address the problem of detecting and collecting fugitive emissions resulting from stem seal deterioration and wear.

Other valve coupling apparatuses have addressed the problem of closely coupling a rotary actuator to a rotary controlled ball valve without the use of stem-to-shaft coupling devices. For example, the devices disclosed in U.S. Pat. No. 4,719,939 and U.S. Pat. No. 4,887,634 provide a means for closely coupling a rotary actuator to a valve stem without the use of a separate stem-to-shaft coupler. In those devices, the actuator is attached to the valve by a bracket plate which coaxially aligns the valve shaft with a drive socket located in the actuator. Those devices, however, provide no means for detecting or collecting the fugitive emissions that by-pass the stem seals before they reach the surrounding environment.

Thus, the need exists for an apparatus adapted to closely couple a rotary actuator to a rotary controlled valve while also providing a means for detecting and collecting fugitive emissions that by-pass the valve stem seals without creating a condition which allows a greater amount of fugitive liquid to by-pass the stem seals.

SUMMARY OF THE INVENTION

In accordance with the present invention, there is provided an improved mounting/coupling apparatus for directly coupling a rotary actuator to a rotary controlled valve while minimizing the stresses on the valve stem seals and providing a means for detecting and collecting fugitive emissions before they reach the surrounding environment. The apparatus of the present invention is adapted for use with an actuator having a rotary drive socket therein and a valve that has primary and secondary stem seals and a primary fugitive fluid collection chamber located therebetween.

The present mounting/coupling apparatus includes a flanged mounting member that is disposed between the actuator and the valve and is adapted to permit the valve stem to be coaxially received in the rotary drive socket. The flanged mounting member is removable attached to the actuator and the upper portion of the valve by a plurality of cap screws that are threadedly received in corresponding threaded bores located in the actuator and the valve. O-rings, retained within annular grooves in the mounting member flanges, are provided to create a fluid-tight seal between the mounting member and the actuator and the mounting member and the valve. The O-rings, in cooperation with the actuator, the mounting member and the valve, serve to create a secondary fugitive fluid collection chamber for collecting fugitive fluid that has by-passed the secondary stem seal. In addition, a detection port may be furnished in the mounting member to enable a detection device to monitor leakage into the secondary collection chamber and thus provide redundant fugitive fluid detection and collection capabilities.

According to one embodiment of the present invention, the mounting member can be integrally formed into the valve body and thus eliminate the need for a sealing means between the mounting member and the valve. Finally, the capacity of the secondary fluid collection chamber can easily be increased by attaching a fluid transfer conduit from the secondary chamber to a larger fluid-tight chamber located remote from the valve.

Accordingly, the present invention provides solutions to the aforementioned problems encountered when using actuator mounting devices and fugitive leak collection and detection devices in connection with rotary actuator valves. The present invention provides a means for directly coupling a valve stem to a rotary actuator while also providing a means for detecting and collecting fugitive emissions that by-pass the secondary valve stem seals without placing additional stresses on the same.

BRIEF DESCRIPTION OF THE DRAWINGS

For the present invention to be clearly understood and readily practiced, preferred embodiments will now be described, by way of example only, with reference to the accompanying figures wherein:

FIG. 2 is an end view of the coupled actuator and ball valve of FIG. 1;

FIG. 3 is a cross-sectional view of the mounting member of the present invention;

FIG. 5 is an end view of the coupled actuator and ball valve of FIG. 4.

DETAILED DESCRIPTION OF THE PREFERRED EMBODIMENTS

Figure 1:
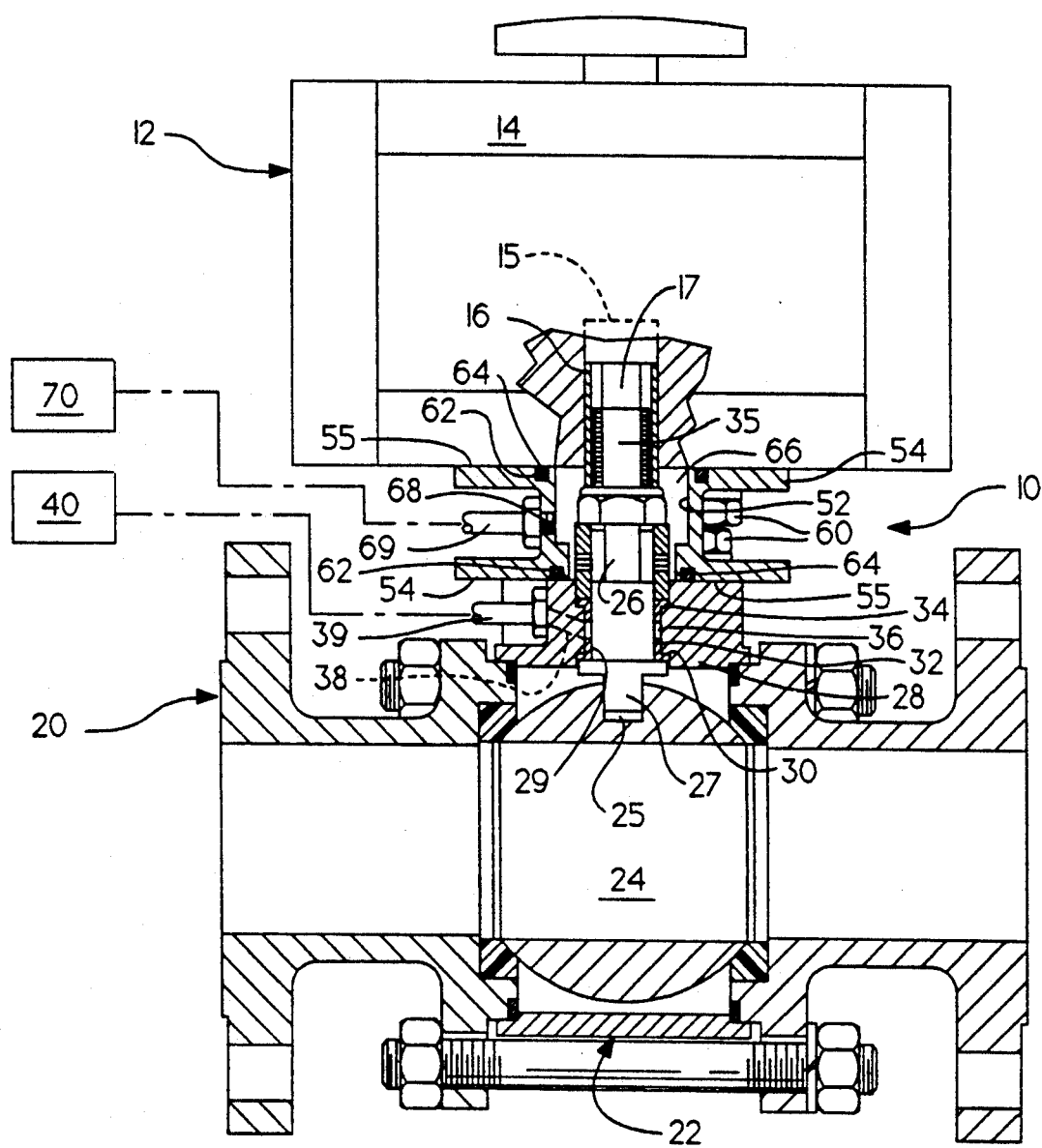
FIG. 1 is a cross-sectional view of a conventional rotary actuator and a ball valve joined by the mounting-/coupling apparatus of the present invention.

Referring now to the drawings for purposes of illustrating the preferred embodiments of the present invention only, and not for purposes of limiting the same, the figures show a mounting and sealing apparatus generally designated as 10 for directly coupling a conventional actuator 12 to a ball valve 20 according to the teachings of the present invention. More particularly, and with reference to FIG. 1, the rotary actuator 12, is exemplary of typical rotary actuators, the construction and operation of which are well known in the art. As such, a detailed description of the operation of the actuator 12 need not be set forth herein beyond that which is necessary to understand the present invention. It will therefore be understood that the actuator 12 consists of a housing 14 that contains rotary motion output means (not shown) which may take the form of pneumatically or electrically actuated gear and shaft combinations, generally designated as 15, that are arranged to impart a rotary motion to a stem receiving bushing 16 that is rotatably housed within the actuator 12.

The valve 20 is exemplary of ball valves having stem seal arrangements that include a means for detecting and collecting fugitive liquid that by-passes the primary stem seal. It will be appreciated by those of ordinary skill in the art, however, that the present invention may be adapted for use with other types of rotary controlled valves having similar valve stem seal arrangements. Hereinagain, the construction and operation of valve 20 need not be discussed beyond that which is necessary to fully appreciate and understand the present invention. As such, it will be understood that valve 20 has a flow control member 24 that is operatively disposed within a valve body generally designated as 22. A valve stem 26, having a circular cross-section, has a rectangular tab portion 27 that depends from a lower end thereof and is non-rotatably received in a rectangular socket 25 located in the top of the flow control member 24.

To accommodate the valve stem 26 and provide support therefor, valve body 22 has an enlarged bonnet portion 28 located on the stem side of the valve 20. The bonnet 28 has an axial bore 29 therethrough that is sized to receive the valve stem 26 and flanged primary and secondary stem seals 32 and 34, respectively, that are adapted to retard fugitive fluid leakage along the valve stem 26. In particular, the primary flanged stem seal 32 is coaxially received on the valve stem 26 and is adapted to cooperate with a coaxial counterbore 30 in bonnet portion 28 to create a first fluid-tight seal between the valve stem 26 and the bonnet 28. The secondary flanged stem seal 34 is also coaxially received on the valve stem 26 and is retained in a spaced apart relationship with the primary stem seal 32 to define a first fugitive liquid collection chamber 36 therebetween. It will be appreciated that when fugitive fluid has by-passed the primary stem seal 32, the fluid will collect in the collection chamber 36 until the secondary stem seal 34 fails. As most clearly shown in FIGS. 1 and 4, a port 38 may be provided through the bonnet 28 to communicate with the collection chamber 36 to thereby enable a first fluid detecting mechanism, generally designated as 40, to monitor through a conduit 39 the presence of fugitive liquid in the collection chamber 36. In addition, or in the alternative, an exterior collecting chamber (not shown) may be similarly attached to the collection chamber 36 to provide additional fluid collection capacity.

The present invention is adapted to removably fasten the actuator 12 to the valve 20 in a manner to cause the valve stem 26 to be coaxially received in the stem receiving bushing 16. In particular, as shown in FIGS. 1 and 3, the present invention consists of a mounting member 50, having an axial bore 52 therethrough that is adapted to coaxially receive the valve stem 26 therein. In the preferred embodiment, flange members 54 extend from the top and bottom of the mounting member 50 in confronting relationship with the actuator housing 14 and the upper portion of the valve bonnet 28. Preferably, the flange members 54 and the mounting member 50 consist of a single casting and are cast from machinable material such as cast iron or stainless steel. However, those of ordinary skill in the art will appreciate that the mounting member 50 and the flanges 54 may be fabricated out of any suitable material that is compatible with the fluid medium being handled and may be fastened together by any suitable fastening means capable of creating a fluid-tight seal therebetween.

A plurality of bores 56 (shown only in FIG. 3), preferably four, are provided in each flange member 54 for receiving cap screws 60 therein. More specifically, the mounting member 50 is removably attached to the actuator housing 14 by capscrews 60 that extend through bores 56 to be threadedly received in corresponding threaded bores 18 (see FIG. 2) provided in the actuator housing 14. Similarly, the mounting member 50 is also removably attached to the valve bonnet 28 by capscrews 60 that extend through the bores 56 in the flange 54 to be threadedly received in corresponding threaded bores 33 (See FIG. 2) provided in the valve bonnet 28. It will be appreciated that when coupled together in the manner described immediately above, the mounting member 50 serves to align and retain the stem 26 coaxially within the stem receiving bushing 16. It will be further appreciated that the stem receiving bushing 16 is configured with flat side portions 17 for non-rotatable engagement with flat surfaces 35 provided on the stem member 26 to thereby enable the stem 26 to be non-rotatably attached to the stem receiving bushing 16.

In the preferred embodiment, flange members 54 each have a machined outer surface 55 for confronting engagement with the actuator housing 14 and the valve bonnet 28. An O-ring 64 is provided in an annular groove 62 located in each flange member 54 to achieve a fluid-tight seal between the actuator housing 14 and the mounting member 50 and the valve bonnet 28 and the mounting member 50. When fastened in the above-described manner, the mounting member 50, in cooperation with the bottom of the actuator housing 14 and the top of the valve bonnet 28, creates a secondary fugitive fluid collection chamber 66 outboard of the secondary stem seal 34. The O-rings 64, in effect, provide a tertiary sealing means around the valve stem 26 and serve to make the secondary fugitive collection chamber 66 fluid-tight for collecting the fugitive fluid by-passing the secondary stem seal 34.

In the preferred embodiment, fugitive leakage that has by-passed the secondary stem seal 34 is detected by a conventional fluid detector generally designated as 70. More specifically, a conventional fluid or gas detection device 70 is connected to the secondary chamber 66 through a threaded port 68 and conduit 69 as shown in FIG. 1. In the alternative, a fluid-tight sight window (not shown) may be provided in the mounting member 50 to provide visual access into the secondary fugitive fluid collection chamber 66. The present invention, therefore, provides a method of detecting leakage as it enters the secondary fluid collection chamber 66. As such, the present invention provides redundant fugitive fluid collection and detection means which can be very advantageous in providing maintenance personnel with additional warning and repair preparation time. We have found this attribute to be invaluable in hazardous chemical piping systems that have lengthy shutdown procedures which must be completed before the valve repairs can be undertaken. It will be further appreciated that the capacity of the second fugitive fluid collection chamber 66 may be easily increased by attaching a conduit (not shown) from the second collection chamber 66 to a separate fluid-tight collection reservoir (not shown) located remote from the valve 20.

Figure 4:
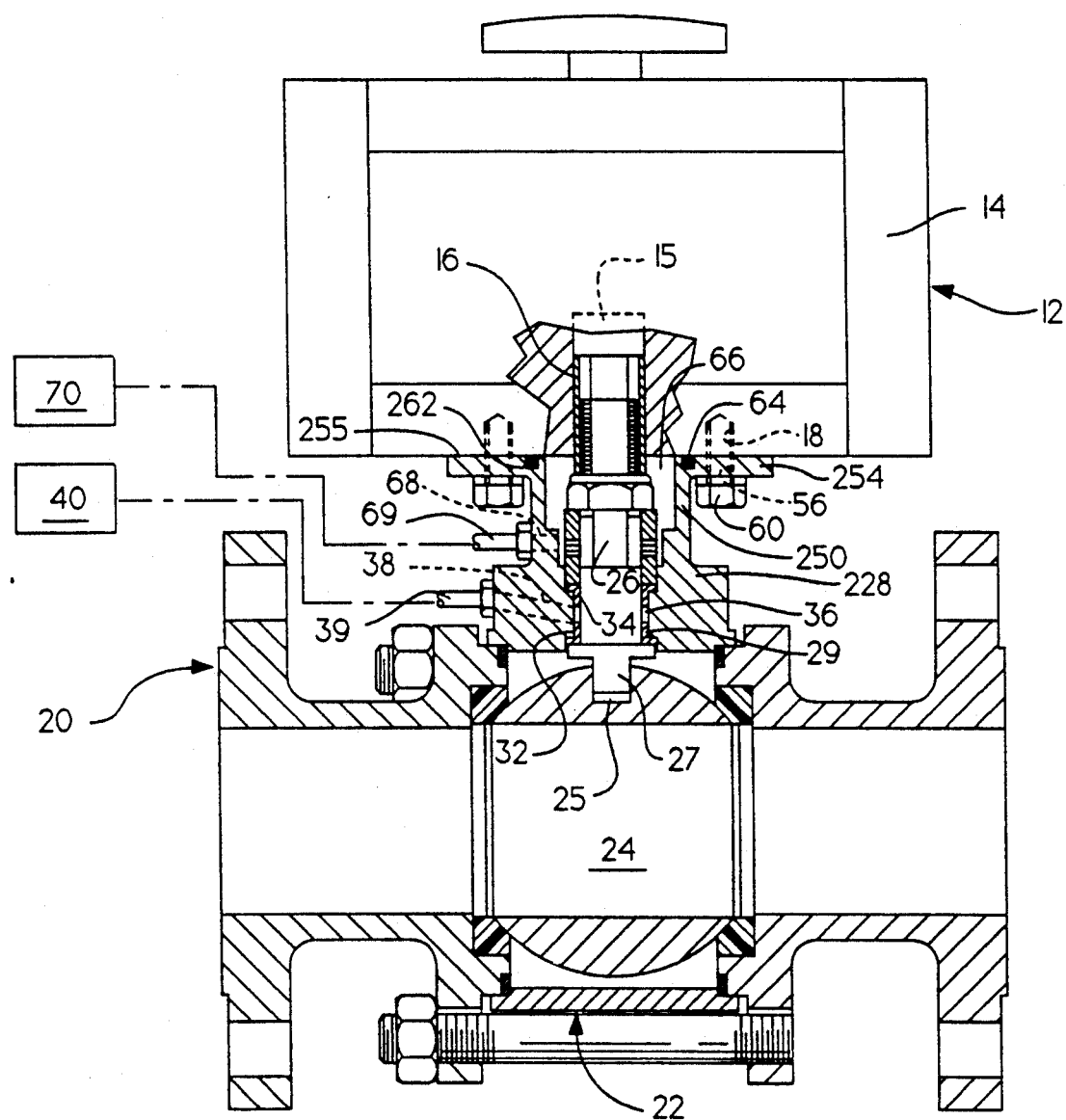
FIG. 4 is a cross-sectional view of a second preferred embodiment of the present invention wherein the mounting member is an integral part of the valve body.

FIGS. 4 and 5 disclose a second preferred embodiment of the present invention. In FIGS. 4 and 5, like elements have like reference numbers and function in the same manner as described hereinabove. As can be clearly seen, a mounting member 250 is an integral part of a valve bonnet 228. A flange portion 254 is provided on an outboard end of the valve bonnet 228 in confronting relationship with the actuator housing 14. It will be appreciated by those of ordinary skill in the art that the mounting member 250 and the valve bonnet 228 consist of one integral casting made from machineable material that is compatible with the type of fluid being handled.

Preferably, the flange 254 has a machined outer surface 255 for a confronting relationship with the actuator housing 14. An O-ring 64 is provided in an annular groove 262 located in the flange portion 254 to provide a fluid-tight seal between the actuator housing 14 and the flange portion 254. As such, the secondary fugitive fluid collection chamber 66 is formed within the valve bonnet 228. It will be understood that the fluid detection apparatus 70 may be similarly attached to the collection chamber 66 in the same manner as described hereinabove. Also, a fluid-tight sight-window (not shown) may also be provided in the valve bonnet 228 to provide visual access into the collection chamber 66.

The present invention as described hereinabove addresses the fugitive emission problems encountered when using rotary controlled valves. In particular, the present invention provides a means for collecting and detecting fugitive fluid emissions that have by-passed the secondary stem seal on a rotary controlled valve. In doing so, the present invention also provides a means for coupling a rotary actuator to the stem of a rotary controlled valve without the use of stem extension members and stem-to-shaft couplers that tend to stress and weaken the valve stem seals. However, it will be appreciated that various changes in the details, materials and arrangements of parts which have been herein described and illustrated may be made by those of ordinary skill in the art within the principle and scope of the invention as expressed in the appended claims.

What is claimed is:

1. In the combination of a rotary valve having a valve housing and an actuator therefor having a housing and a rotary drive means, said rotary valve having primary and secondary sealing means surrounding a first valve stem portion and defining a first fluid collection chamber, the improvement comprising:

a mounting member disposed between said actuator and said valve housing and adapted to engage said actuator to allow a second valve stem portion extending beyond said mounting member to directly engage said rotary drive means of said actuator while maintaining a driving alignment therebetween; and spaced tertiary sealing means surrounding said first valve stem portion outboard of said secondary sealing means, said tertiary sealing means including a seal member cooperating with said mounting member and said valve housing where they engage one another and another seal member cooperating with said mounting member and said actuator housing where they engage one another to define a second fluid collection chamber therebetween to collect any fluid that leaks from said first collection chamber past said secondary sealing means.

2. The improvement of claim 1 wherein said mounting member is cylindrical thereby defining an axial bore extending from the top to a bottom thereof, said mounting member further comprising:

flanged end portions rigidly attached to said top and bottom of said mounting member, one said flanged end portion being configured for confronting relationship with said actuator housing and the other said flanged end portion being configured for confronting relationship with said valve housing;

said axial bore extending through said mounting member for receiving said first valve stem portion therein; and fastening means for removably fastening said flanged end portions of said mounting member to said actuator housing and said valve housing so that said second valve stem portion is permitted to coaxially engage said rotary drive means of said actuator.

3. The improvement of claim 2 wherein each said flanged end portion has an annular groove therein.

4. The improvement of claim 3 wherein said spaced tertiary sealing means comprises an O-ring positioned in each said annular groove of each said flanged end portion to provide a fluid-tight seal between said mounting member and said actuator housing and between said mounting member and said valve housing.

5. The improvement of claim 4 further comprising means for detecting the presence of fluid in said second fluid collection chamber.

6. The improvement of claim 5 wherein said fluid detection means further comprises a fluid-tight sight-window means constructed in said mounting member to provide visual access into said second fluid collection chamber.

7. The improvement of claim 6 further comprising a fluid-tight reservoir mounted remote from said second fluid collection chamber and being connected thereto by a fluid-handling circuit.

8. The improvement of claim 7 wherein said mounting member is integrally formed in said valve housing.

9. In the combination of a rotary valve having a valve housing and an actuator therefor having a housing and a rotary drive means, said rotary valve having primary and secondary sealing means surrounding a first valve stem portion and defining a first fluid collection chamber, the improvement comprising:

a flanged mounting member integrally formed in said valve housing for engagement with said actuator housing, said flanged mounting member having an annular groove configured for confronting relationship with said actuator housing, said mounting member being further configured to allow a second valve stem portion extending beyond said mounting member to directly engage said rotary drive means of said actuator while maintaining driving alignment therebetween;

an O-ring positioned in said annular groove to provide a fluid-tight seal between said actuator housing and said mounting member and defining a second fluid collection chamber between said actuator housing and said secondary sealing means;

fastening means for removably fastening said flanged mounting member to said actuator housing; and fluid detection means for detecting the presence of fluid that has by-passed the secondary stem sealing means and entered said second fluid collection chamber.

* * * * *

UNITED STATES PATENT AND TRADEMARK OFFICE
CERTIFICATE OF CORRECTION

PATENT NO. : 5,203,370
DATED : April 20, 1993
INVENTOR(S) : Gary C. Block and Gary W. Friedline It is certified that error appears in the above-identified patent and that said Letters Patent is hereby corrected as shown below:

Col. 1, line 44, delete "the", second occurrence.

Col. 2, line 18, delete "impact" and substitute therefor --impart--.

Col. 2, line 19, delete "non" and substitute therefor --not--.

Col. 2, line 66, delete "removable" and substitute therefor --removably--.

Signed and Sealed this

Fourth Day of January, 1994

Attest:

BRUCE LEHMAN

*Attesting Officer*      *Commissioner of Patents and Trademarks*